US008802319B2

(12) United States Patent
Koo et al.

(10) Patent No.: US 8,802,319 B2
(45) Date of Patent: Aug. 12, 2014

(54) BLOCK COPOLYMER ELECTROLYTE COMPOSITE MEMBRANES AND METHODS OF PRODUCING THE SAME

(75) Inventors: Chong-Min Koo, Gyeonggi-do (KR); Soon-Man Hong, Seoul (KR); Seung-Sang Hwang, Seoul (KR); Kyung-Youl Baek, Seoul (KR); Jang-Woo Lee, Seoul (KR); Jin-Hong Lee, Busan (KR); Youn-Duk Park, Seoul (KR); Kyung-ho Min, Chungbuk (KR); Ji-Young Jung, Daejeon (KR)

(73) Assignee: Korea Institute of Science and Technology, Seoul (KR)

( * ) Notice: Subject to any disclaimer, the term of this patent is extended or adjusted under 35 U.S.C. 154(b) by 108 days.

(21) Appl. No.: 13/290,390

(22) Filed: Nov. 7, 2011

(65) Prior Publication Data
US 2012/0282532 A1    Nov. 8, 2012

(30) Foreign Application Priority Data

May 6, 2011    (KR) .......................... 10-2011-0042894

(51) Int. Cl.
*H01M 8/10*    (2006.01)
*H01G 9/02*    (2006.01)
*C08J 5/20*    (2006.01)

(52) U.S. Cl.
USPC .......... 429/492; 429/493; 429/408; 252/62.2; 521/25; 521/26; 521/27

(58) Field of Classification Search
None
See application file for complete search history.

(56) References Cited

FOREIGN PATENT DOCUMENTS

KR    10-0522216 B1    10/2005
WO    02/33709 A1    4/2002

OTHER PUBLICATIONS

Byung-Kil Park, et al; "Organic/inorganic Hybrid Electrolytes for the Application of Direct Mehtanol Fuel Cell (DMFC)-Preparation and Properties of Sulfonated SEBS (SSEBS)-clay Hibrid membranes", Membrane Journal, vol. 15, No. 2, Jun. 2005, pp. 165-174.
Chang Houn Rhee, et al; "Nafion/Sulfonated Montmorillonite Composite: A New Concept Electrolyte Membrane for Direct Methanol Fuel Cells", Chem. Mater. vol. 17, pp. 1691-1697; Published on Web Mar. 10, 2005.
Guang Hua Li, et al; "Preparation of poly(vinyl Phosphate-$b$-styrene) copolymers and its blend with PPO as proton exchange membrane for DMFC applications", Solid State Ionics, vol. 177, Issue 11-12; pp. 1083-1090, Received Aug. 3, 2005, revised Feb. 28, 2006; Accepted Mar. 2, 2006; Available online Apr. 19, 2006.
Ji-Won Rhim, et al; "Crosslinked poly(vinyl alcohol) membranes containing sulfonic acid group: proton and methanol transport through membranes", Journal of Membrane Science, vol. 238, Issues 1-2, Jul. 15, 2004, pp. 143-151; Received Aug. 27, 2003, revised Mar. 19, 2004, Accepted Mar. 19, 2004, Available online May 28, 2004.

(Continued)

*Primary Examiner* — Milton I Cano
*Assistant Examiner* — Carmen Lyles-Irving
(74) *Attorney, Agent, or Firm* — Ladas & Parry LLP

(57) ABSTRACT

The present invention relates to block copolymer electrolyte composite membranes with improved ionic conductivity. The block copolymer electrolyte composite membrane in accordance with an aspect of the present invention can comprise a plate-like inorganic filler as surface-modified with a sulfonic group; and a block copolymer comprising at least one selected from the group consisting of a sulfonic group, a carbonic acid group, and a phosphoric acid group.

11 Claims, 1 Drawing Sheet

(56) References Cited

OTHER PUBLICATIONS

Maria Gil, et al; "Direct synthesis of sulfonated aromatic poly(ether ether ketone) proton exchange membranes for fuel cell applications", Journal of Membrane Science, vol. 234, Issues 1-2, May 1, 2004, pp. 75-81; Received Jun. 6, 2003, revised Dec. 17, 2003; Accepted Dec. 30, 2003, Available online Mar. 14, 2004.

Mohammad Luqman, et al; "Sulfonated polystyrene-based ionic polymer-metal composite (IPMC) actuator", Journal of Industrial and Engineering Chemistry 17, Jan. 25, 2011, pp. 49-55, Received Dec. 21, 2009, Accepted Mar. 10, 2010, Available online Oct. 8, 2010.

Xuan-Lun Wang, et al; "Biomimetic electro-active polymer based on sulfonated poly(styrene-b-ethylene-co-butylene-b-styrene)", Materials Letters, vol. 61, Issue 29, Dec. 2007, pp. 5117-5120; Received Feb. 22, 2007; Accepted Apr. 1, 2007. Available online Apr. 12, 2007.

BLOCK COPOLYMER ELECTROLYTE COMPOSITE MEMBRANES AND METHODS OF PRODUCING THE SAME

FIELD OF THE INVENTION

The present invention relates to block copolymer electrolyte composite membranes and methods of producing the same, and more specifically block copolymer electrolyte membranes with improved ionic conductivity.

BACKGROUND OF THE ART

Recently, researches on fuel cells, rechargeable batteries, capacitors, and polymer actuators applicable to the fields of electrical, electronic, mechanical, or bio industries have been under way for alternative energy sources and energy storage/output mediums in order to make provision against depletion of fossil fuels. Fuel cells such as a proton exchange membrane fuel cell (PEMFC) and a direct methanol fuel cell (DMFC) and an ionic polymer-metal composite (IPMC) actuator are composed of a unit assembly consisting of a polymer electrolyte layer and a pair of metallic catalyst layers or electrode layers. In addition, a rechargeable battery and a capacitor may comprise polymer electrolytes in each of electrolyte layers therein.

Polymer electrolyte membranes of the fuel cells such as PEMFC and DMFC are required to have a range of characteristics such as a low level of fuel permeability, a high level of mechanical strength and dimensional stability, strong adhesion to a catalyst layer, a high level of proton conductivity, and the like. The polymer electrolyte membranes mounted on the IPMC actuator are also required to show the characteristics of the electrolyte membrane that are necessary for the polymer fuel cells.

Despite many researches made on the polymer fuel cells and actuators, their commercialization still needs improvement of their performance and reductions in their production costs. This is because their preparation needs to use electrodes of noble metals such as platinum (Pt) and gold (Au) and expensive polymer electrolytes such as Nafion commercially available from DuPont Inc. (U.S.A.), which entails high production cost.

In order to reduce the production cost of the polymer electrolytes, it is required that new polymer electrolytes be synthesized and modified to have an enhanced level of performance comparable to that of the conventional polymer electrolytes such as Nafion, thereby replacing the expensive Nafion.

Various polymer electrolytes such as sulfonated aromatic poly(ether ether ketone) (s-PEEK) (see: M. Gil et al., *J. Mem. Sci.*, 234, 2004, 75-81), sulfonated poly(vinyl alcohol) (s-PVA) (see: J. W. Rhim et al., *J. Mem. Sci.*, 238, 2004, 143-151), and sulfonated polystyrene (s-PS) (see: M. Luqman, J. W. Lee, K. K. Moon, and Y. T. Yoo, *J. Ind. Eng. Chem.*, 17, 2011, 49-55) were reported as novel alternative polymer electrolytes. Poly(vinyl phosphate-b-styrene) (PVPP-b-PS) (see: G. H. Li et al., *Solid State Ionics*, 177, 2006, 1083-1090) and sulfonated poly(styrene-b-ethylene-co-butylene-b-styrene) (s-SEBS) (see: X. L. Wang, *Mater. Lett.*, 61, 2007, 5117-5120) were reported as a block copolymer based polymer electrolyte. In recent years, Kraton Inc. (U.S.A.) synthesized a sulfonated styrene penta-block copolymer having a well-controlled molecular structure and making an improvement in the performance of s-SEBS, poly((t-butyl-styrene)-b-(ethylene-r-propylene)-b-(styrene-r-styrene sulfonate)-b-(ethylene-r-propylene)-b-(t-butyl-styrene)) (tBS-EP-SS-EP-tBS) by using an anionic polymerization, and commercialized the same. Furthermore, researches have been reported on modifying novel alternative polymer electrolytes by using composite techniques and blending techniques.

However, such polymer electrolytes have yet to achieve satisfactory properties such as ionic conductivity and the like.

DETAILED DESCRIPTION OF THE INVENTION

Technical Objectives

The present invention is to provide block copolymer electrolyte composite membranes and methods of producing the same.

Technical Solutions

A block copolymer electrolyte composite membrane in accordance with an aspect of the present invention can comprise a plate-like inorganic filler surface-modified with a sulfonic group; and a block copolymer comprising at least one selected from the group consisting of a sulfonic group, a carbonic acid group, and a phosphoric acid group.

In the above, the plate-like inorganic filler can comprise at least one selected from the group consisting of montmorillonite, bentonite, saponite, laponite, titanate, and zirconium phosphate.

Furthermore, the block copolymer comprising at least one selected from the group consisting of a sulfonic group, a carbonic acid group, and a phosphoric acid group can comprise at least one selected from the group consisting of poly((t-butyl-styrene)-b-(ethylene-r-propylene)-b-(styrene-r-styrene sulfonate)-b-(ethylene-r-propylene)-b-(t-butyl-styrene)), sulfonated poly(styrene-b-ethylene-co-butylene-b-styrene), poly(styrene-b-acrylic acid), poly(ethylene oxide-b-acrylic acid), poly(vinyl phosphate-b-styrene), poly(styrene-b-vinyl benzyl phosphonic acid), and poly(styrene-b-vinyl sulfonate).

The block copolymer electrolyte composite membrane can comprise 0.01% to 20% by weight of the plate-like inorganic filler surface-modified with a sulfonic group and 80% to 99.99% by weight of the block copolymer comprising at least one selected from the group consisting of a sulfonic group, a carbonic acid group, and a phosphoric acid group.

The block copolymer electrolyte composite membrane can be included in an actuator/a sensor, a fuel cell, a rechargeable battery, or a capacitor.

According to other aspect of the present invention is provided a method of producing a block copolymer electrolyte composite membrane, which comprises the steps of surface-modifying a plate-like inorganic filler with a sulfonic group; adding and dispersing the plate-like inorganic filler as surface-modified in an electrolyte solution of a block copolymer comprising at least one selected from the group consisting of a sulfonic group, a carbonic acid group, and a phosphoric acid group; and drying the electrolyte solution.

In the above, the surface modification step can comprise the steps of surface-treating a plate-like inorganic filler with a silane compound having a thiol group, and oxidizing the thiol group as surface-treated.

The plate-like inorganic filler as surface-modified can be added in an amount no less than 0.0001% by weight and no more than 10% by weight with respect to the electrolyte solution of the block copolymer.

In the electrolyte solution of the block copolymer, the block copolymer comprising at least one selected from the group consisting of a sulfonic group, a carbonic acid group, and a phosphoric acid group can be dissolved at a concentration of 5% to 30% by weight with respect to a solvent.

Furthermore, the dispersing step can be carried out by using a mechanical stirrer and an ultrasonic homogenizer for 12 to 240 hours and 1 to 24 hours, respectively.

Advantageous Effects of the Invention

The block copolymer electrolyte composite membrane according to the present invention comprises plate-like inorganic fillers as surface-modified with a sulfonic group, which play a role of an ionic bridge within the electrolyte and link the ionic domains in the electrolyte one after another, making it possible to improve ionic conductivity of the block copolymer electrolyte composite membrane.

Such block copolymer electrolyte composite membrane can be used with great utility in various fields such as actuators/sensors, fuel cells, rechargeable batteries, capacitors, and the like, wherein an appropriate or higher level of ionic conductivity is required.

DETAILS FOR PRACTICING THE INVENTION

Figure 1:
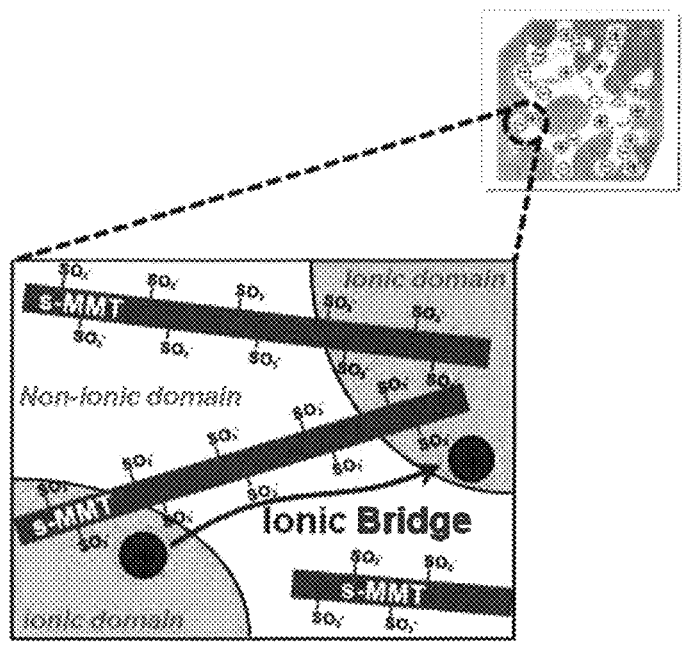
FIG. 1 is a view illustrating an internal structure of the block copolymer electrolyte composite membrane comprising a plate-like inorganic filler as surface-modified with a sulfonic group according to an embodiment of the present invention.

The present invention can be subjected to various sorts of modification and have different examples, and in this regards, certain examples will now be illustrated in the drawings and explained in detail in the specified description of the invention. However, these examples are not intended to limit the present invention to any specific practicing manners and should be understood to include all of modifications, equivalents, and substituents, belonging to the spirit and the technical scope of the present invention. In explanation of the present invention, some specified description regarding related prior arts would be omitted if it can cause any ambiguity as to the gist of the present invention.

According to an aspect of the present invention is provided a block copolymer electrolyte composite membrane, which comprises a plate-like inorganic filler surface-modified with a sulfonic group; and a block copolymer comprising at least one selected from the group consisting of a sulfonic group, a carbonic acid group, and a phosphoric acid group. According to another aspect of the present invention is provided a method of producing a block copolymer electrolyte composite membrane, which comprises the steps of surface-modifying a plate-like inorganic filler with a sulfonic group; adding and dispersing the plate-like inorganic filler as surface-modified in an electrolyte solution of a block copolymer comprising at least one selected from the group consisting of a sulfonic group, a carbonic acid group, and a phosphoric acid group; and drying the electrolyte solution.

Hereinafter, the block copolymer electrolyte composite membrane and the method of producing the same according to embodiments of the present invention will be explained in detail.

The block copolymer electrolyte composite membrane according to the embodiments of the present invention can comprise a plate-like inorganic filler surface-modified with a sulfonic group; and a block copolymer comprising at least one selected from the group consisting of a sulfonic group, a carbonic acid group, and a phosphoric acid group.

The types of available inorganic fillers include a rod structure and a plate structure, and one can preferably employ the plate structure. Using the plate or rod structure with a very high aspect ratio (i.e., the ratio of the length to the width) allows the fillers to occupy a small volume within the electrolyte zone, while linking the ionic domains in the electrolyte one after another, thereby making it possible to effectively enhance the ionic conductivity of the block copolymer electrolyte composite membrane.

Preferably, the plate-like inorganic filler can comprise at least one selected from the group consisting of montmorillonite, bentonite, saponite, laponite, titanate and zirconium phosphate.

Furthermore, the block copolymer comprising at least one selected from the group consisting of a sulfonic group, a carbonic acid group, and a phosphoric acid group can comprise at least one selected from the group consisting of poly((t-butyl-styrene)-b-(ethylene-r-propylene)-b-(styrene-r-styrene sulfonate)-b-(ethylene-r-propylene)-b-(t-butyl-styrene)), sulfonated poly(styrene-b-ethylene-co-butylene-b-styrene), poly(styrene-b-acrylic acid), poly(ethylene oxide-b-acrylic acid), polyvinyl phosphate-b-styrene), poly (styrene-b-vinyl benzyl phosphonic acid) and poly(styrene-b-vinyl sulfonate).

The block copolymer electrolyte composite membrane can comprise 0.01% to 20% by weight of the plate-like inorganic filler as surface-modified with a sulfonic group; and 80% to 99.99% by weight of the block copolymer comprising a sulfonic group, a carbonic group, and a phosphoric acid.

In the block copolymer electrolyte composite membrane, the plate-like inorganic fillers as surface-modified with sulfonic group are added to the block copolymer electrolyte so that the plate-like inorganic fillers as surface-modified serve as ionic bridges to link the ionic domains within the electrolyte one after another, thereby making it possible to improve the ionic conductivity of the block copolymer composite membrane.

FIG. 1 is a view illustrating the internal structure of the block copolymer electrolyte composite membrane prepared by using the plate-like inorganic filler as surface-modified with a sulfonic group in accordance with an embodiment of the present invention. As can be shown by FIG. 1, within the block copolymer electrolyte composite membrane, the plate-like inorganic fillers as surface-modified with a sulfonic group play a role of ionic bridges and thereby protons can move between the ionic domains.

According to another aspect of the present invention is provided a method of producing a block copolymer electrolyte composite membrane, which comprises the steps of surface-modifying a plate-like inorganic filler with a sulfonic group; adding and dispersing the plate-like inorganic filler as surface-modified in an electrolyte solution of a block copolymer comprising at least one selected from the group consisting of a sulfonic group, a carbonic acid group, and a phosphoric acid group; and drying the electrolyte solution.

First of all is carried out a step of surface-modifying the plate-like inorganic fillers with a sulfonic group ($-SO_3H$). The surface-modification step can comprise surface-treating the plate-like inorganic fillers with a silane compound having a thiol group and oxidizing the thiol group as surface-treated. Such surface modification can be carried out through a sulfonation reaction with using a silane having a thiol group. After the surface of the plate-like inorganic fillers are grafted with a silane having a thiol group, the thiol group of the silane grafted onto the surface of the filler is oxidized to be replaced with a sulfonic group. As the silane compound having a thiol group, one can use 3-mercapto propyl trimethoxy silane, 3-mercapto propyl dimethoxy methyl silane, 3-mercapto propyl triethoxy silane, or the like.

In the above, the plate-like inorganic filler can be added in an amount no less than 0.0001% by weight and no more than 10% by weight with respect to the electrolyte solution of the block copolymer. If the content of the filler is less than 0.0001% by weight, it is too small to bring forth any effect of improving the ionic conductivity. If the content of the filler exceeds 10% by weight, the dispersion state of the filler can deteriorate so that one may not get any effect of improving the ionic conductivity.

Then, the plate-like inorganic filler as surface-modified with a sulfonic group can be added in the electrolyte solution of the block copolymer.

The electrolyte solution of the block copolymer comprises a block copolymer electrolyte that is mixed with a non-polar solvent such as heptane, cyclohexane, and the like. The types of the solvent is not particularly limited. The block copolymer electrolyte can comprise at least one selected from a penta-block copolymer such as poly((t-butyl-styrene)-b-(ethylene-r-propylene)-b-(styrene-r-styrene sulfonate)-b-(ethylene-r-propylene)-b-(t-butyl-styrene)), a tri-block copolymer such as sulfonated poly(styrene-b-ethylene-co-butylene-b-styrene), and a di-block copolymer such as poly(styrene-b-acrylic acid), poly(ethylene oxide-b-acrylic acid), poly(vinyl phosphate-b-styrene), poly(styrene-b-vinyl benzyl phosphonic acid), poly(styrene-b-vinyl sulfonate) and the like.

In the electrolyte solution of the block copolymer, the block copolymer comprising at least one selected from the group consisting of a sulfonic group, a carbonic acid group, and a phosphoric acid group can be dissolved at a concentration of 5% to 30% by weight with respect to a solvent. This is due to the following reasons: if the concentration of the electrolyte solution of the block copolymer is less than 5% by weight, large amount of the solvent needs to be evaporated in the film formation, and this takes a lot of time for preparation. If the concentration exceeds 30% by weight, uniformity of the electrolyte solution cannot be ensured.

After the addition of the plate-like inorganic filler as surface-modified, a mixture of the fillers and the electrolyte solution of the block copolymer is subjected to dispersion. Preferably, the dispersing step can be carried out by a mechanical stirrer and an ultrasonic homogenizer for 12 to 240 hours and 1 to 24 hours, respectively. The dispersion carried out for a period less than each of the above time ranges can lead to a worse state of dispersion, while the dispersion carried out for a period exceeding each of the above time ranges can cause degradation of the plate-like fillers as surface-modified with a sulfonic group.

Then, the steps of casting, drying and annealing the electrolyte solution are carried out. In this regard, the solution can be casted in a typical manner using a bar coater with controlling the thickness thereof, dried at room temperature, and annealed at 50 to 150° C. for 1 to 24 hours.

Hereinafter, the preferred examples of the present invention will be explained in detail with reference to the accompanying drawings. However, it should be understood that these examples are merely illustrative of the present invention and the scope of the present invention shall not be interpreted to be limited by these examples.

Example 1

Montmorillonite (MMT) was prepared as a plate-like inorganic filler. For surface modification of MMT, a 1N aqueous solution of sulfuric acid was added to do ion exchange from $Na^+$-MMT to $H^+$-MMT. Then, in order to graft 3-mercaptopropyltrimethoxy silane (3-MPTMS, Aldrich) (i.e., a silane compound having a thiol group) onto the surface of the MMT particle, MMT and 3-MPTMS were put into toluene, then being refluxed at 115° C. for 12 hours. At this time, the weight ratios among MMT, 3-MPTMS, and toluene was 1:0.2:16. After being refluxed, the resulting mixture was filtered and washed with toluene, and then dried under vacuum.

Then, in order to replace the thiol group (—SH) of 3-MPTMS grafted onto MMT with a sulfonic group (—$SO_3H$), the slurry obtained as above was oxidized with 10% hydrogen peroxide at 60° C. for 12 hours. The oxidized MMT slurry was filtered and washed again with deionized water and ethanol, and then stirred in a 1N aqueous solution of sulfuric acid at room temperature for 1 hour. Then, the resulting product was filtered and washed again with deionized water and ethanol, and then dried at 70° C. for 12 hours. With using a thermogravimetric analyzer (TGA; TG 209 F3 Tarsus, Netzsch, Germany), the number of the chains grafted onto the surface of the sulfonated MMT particle was measured to be 0.30 mmol/g.

In the above, s-MMT was added to the electrolyte solution of the block copolymer at a concentration of 4% by weight and dispersed therein by using a mechanical stirrer (PC-420D, Corning, USA) and then an ultrasonic homogenizer (UIL-15040H, UIL Ultrasonic, Korea) for 12 hours and 90 minutes, respectively. In this example, a sulfonated styrenic penta-block copolymer dispersion (MD-9150, Kraton, USA), wherein a penta-block copolymer, poly((t-butyl-styrene)-b-(ethylene-r-propylene)-b-(styrene-r-styrene sulfonate)-b-(ethylene-r-propylene)-b-(t-butyl-styrene)) was dispersed in a mixture of non-polar solvents (heptane and cyclohexane) at a concentration of 10% by weight with respect to the solvent, was used as the block copolymer electrolyte.

Then, after the block copolymer electrolyte composite membrane was left at room temperature for 5 hours in order for bubbles therein to be eliminated, the composite membrane was casted with using a bar coater (Comate™ 3000VH, KIPAE Engineering & Technology, Korea) for a control of the membrane thickness, and then was dried for 12 hours and annealed at 120° C. for 2 hours, and thereby its thickness was adjusted to be 250 μm.

Then, in order to do ion-exchange with protons, the resulting membrane was immersed in 2N HCl and distilled water at 80° C. for 30 minutes, respectively, to be prepared as a s-MMT (a surface-modified MMT)/block copolymer electrolyte composite membrane.

Example 2

An s-LP (a surface-modified laponite)/block copolymer electrolyte composite membrane was prepared with the same method as Example 1 except for using laponite (LP) as a plate-like inorganic filler.

Example 3

An s-SP (a surface-modified saponite)/block copolymer electrolyte composite membrane was prepared with the same method as Example 1 except for using saponite (SP) as a plate-like inorganic filler.

Comparative Example 1

Montmorillonite (MMT) was prepared as a plate-like inorganic filler. The MMT was added to a block copolymer electrolyte solution at a concentration of 4% by weight, and dispersed therein by using a mechanical stirrer (PC-420D, Corning, USA) and then an ultrasonic homogenizer (UIL-15040H, UIL Ultrasonic, Korea) for 12 hours and 90 minutes, respectively. In this example, a sulfonated styrenic penta-block copolymer dispersion (MD-9150, Kraton, USA), wherein a penta-block copolymer, poly((t-butyl-styrene)-b-(ethylene-r-propylene)-b-(styrene-r-styrene sulfonate)-b-(ethylene-r-propylene)-b-(t-butyl-styrene)) was dispersed in a mixture of non-polar solvents (heptane and cyclohexane) at a concentration of 10% by weight with respect to the solvent, was used as the block copolymer electrolyte.

Then, after the block copolymer electrolyte composite membrane was left at room temperature for 5 hours in order for bubbles therein to be eliminated, the composite membrane was casted with using a bar coater (Comate™ 3000VH, KIPAE Engineering & Technology, Korea) for a control of the membrane thickness, and then was dried for 12 hours and annealed at 120° C. for 2 hours, and thereby its thickness was adjusted to be 250 μm.

Then, in order to do ion-exchange with protons, the resulting membrane was immersed in 2N HCl and distilled water at 80° C. for 30 minutes, respectively, to be prepared as a MMT/block copolymer electrolyte composite membrane.

Comparative Example 2

An LP (a non-modified laponite)/block copolymer electrolyte composite membrane was prepared with the same method as Comparative Example 1 except for using laponite (LP) with no surface modification as a plate-like inorganic filler.

Comparative Example 3

An SP (a non-modified saponite)/block copolymer electrolyte composite membrane was prepared with the same method as Comparative Example 1 except for using saponite (SP) with no surface modification as a plate-like inorganic filler.

Comparative Example 4

A block copolymer electrolyte composite membrane was prepared with the same method as Comparative Example 1 except for not using any plate-like inorganic filler.

Test Example

Figure 2:
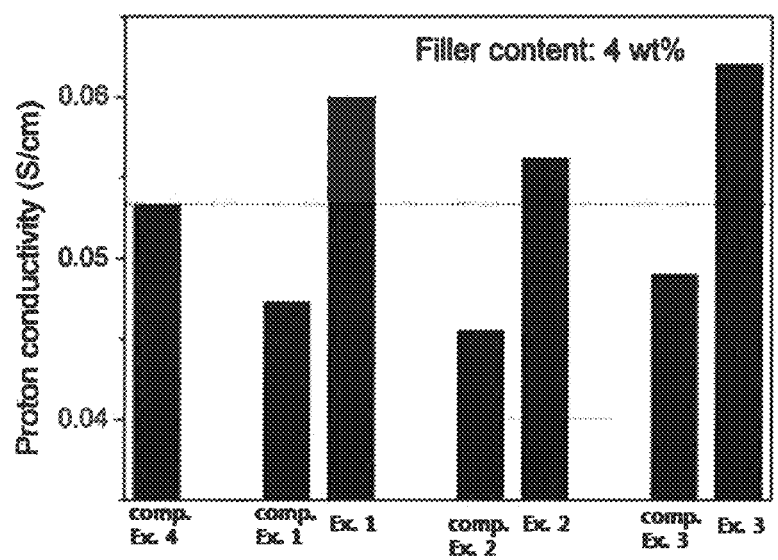
FIG. 2 is a graph showing ionic conductivity of the block copolymer electrolyte composite membranes prepared in accordance with the examples and the comparative examples of the present invention.

With using an electrochemical impedance spectroscope (EIS; VMP3, BioLogic Science Instruments, USA), the proton conductivity for each of the block copolymer electrolyte composite membranes of the examples and the comparative examples (the content of the filler: 4% by weight) was measured and the results are shown in FIG. 2. FIG. 2 is a graph showing the proton conductivity of the block copolymer electrolyte composite membrane prepared according to the examples and the comparative examples of the present invention.

As shown in FIG. 2, the block copolymer electrolyte membranes of Examples 1, 2, and 3 prepared by using the plate-like inorganic filler as surface-modified were found to exhibit enhanced ionic conductivity in comparison with the block copolymer electrolyte composite membrane prepared without adding any filler. Moreover, the membranes of Comparative Examples 1, 2, and 3 prepared by using the filler with no surface-modification showed a lower level of the ionic conductivity than those of the membranes of Examples 1, 2, and 3.

The foregoing block copolymer electrolyte composite membrane can be used with great utility in various fields such as actuators/sensors, fuel cells, rechargeable batteries, capacitors, and the like, wherein an appropriate or higher level of ionic conductivity is required.

Hereinabove, specific aspects of the present invention have been described in detail, and it should be apparent to a person of ordinary skill in the art that such specified description involves merely preferred aspects of the present invention, and the scope of the present invention shall not be limited thereto. Thus, the substantial scope of the present invention should be defined by the appended claims and the equivalents thereof.

What is claimed is:

1. A penta-block copolymer electrolyte composite membrane, which comprises:
    a platelet inorganic filler surface-modified with a sulfonic group; and
    a penta-block copolymer comprising at least one selected from the group consisting of a sulfonic group, a carbonic acid group, and a phosphoric acid group,
    wherein the penta-block copolymer consists of poly((t-butyl-styrene)-b-(ethylene-r-propylene)-b-(styrene-r-styrene sulfonate)-b-(ethylene-r-propylene)-b-(t-butyl-styrene)).

2. The block copolymer electrolyte composite membrane according to claim 1, wherein the platelet inorganic filler comprises at least one selected from the group consisting of bentonite, saponite, laponite, titanate, and zirconium phosphate.

3. The block copolymer electrolyte composite membrane according to claim 1, wherein the penta-block copolymer comprising at least one selected from the group consisting of a sulfonic group, a carbonic acid group, and a phosphoric acid group comprises at least one selected from the group consisting of poly((t-butyl-styrene)-b-(ethylene-r-propylene)-b-(styrene-r-styrene sulfonate)-b-(ethylene-r-propylene)-b-(t-butyl-styrene)).

4. The block copolymer electrolyte composite membrane according to claim 1, wherein it comprises 0.01% to 20% by weight of the platelet inorganic filler surface-modified with a sulfonic group, and 80% to 99.99% by weight of the penta-block copolymer comprising at least one selected from the group consisting of a sulfonic group, a carbonic acid group, and a phosphoric acid group.

5. The block copolymer electrolyte composite membrane according to claim 1, wherein it is included in a sensor, a fuel cell, a rechargeable battery, or a capacitor.

6. A method of producing a penta-block copolymer electrolyte composite membrane consisting of poly((t-butyl-styrene)-b-(ethylene-r-propylene)-b-(styrene-r-styrene sulfonate)-b-(ethylene-r-propylene)-b-(t-butyl-styrene)), which comprises the steps of:

surface-modifying a platelet inorganic filler with a sulfonic group;

adding and dispersing the platelet inorganic fillers as surface-modified in an electrolyte solution of a block copolymer comprising at least one selected from the group consisting of a sulfonic group, a carbonic acid group, and a phosphoric acid group; and drying the electrolyte solution to create the penta-block copolymer consisting of poly((t-butyl-styrene)-b-(ethylene-r-propylene)-b-(styrene-r-styrene sulfonate)-b-(ethylene-r-propylene)-b-(t-butyl-styrene)).

7. The method of producing a block copolymer electrolyte composite membrane according to claim 6, wherein the surface-modification step comprises surface-treating the platelet inorganic fillers with a silane compound having a thiol group and oxidizing the thiol group as surface treated.

8. The method of producing a block copolymer electrolyte composite membrane according to claim 6, wherein the platelet inorganic fillers as surface-modified are added in an amount of no less than 0.0001% and no more than 10% by weight with respect to the electrolyte solution of the block copolymer.

9. The method of producing a block copolymer electrolyte composite membrane according to claim 6, wherein the penta-block copolymer comprising at least one selected from the group consisting of a sulfonic group, a carbonic acid group, and a phosphoric acid group can be dissolved at a concentration of 5% to 30% by weight with respect to a solvent.

10. The method of producing a block copolymer electrolyte composite membrane according to claim 6, wherein the dispersing step is carried out by using a mechanical stirrer and an ultrasonic homogenizer for 12 to 240 hours and 1 to 24 hours, respectively.

11. A method of producing a penta-block copolymer electrolyte composite membrane consisting of poly((t-butyl-styrene)-b-(ethylene-r-propylene)-b-(styrene-r-styrene sulfonate)-b-(ethylene-r-propylene)-b-(t-butyl-styrene)), which comprises the steps of:

surface-modifying a platelet inorganic filler with a sulfonic group, wherein the platelet inorganic filler is laponite or saponite;

adding and dispersing the platelet inorganic fillers as surface-modified in an electrolyte solution of a penta-block copolymer comprising at least one selected from the group consisting of a sulfonic group, a carbonic acid group, and a phosphoric acid group;

drying the electrolyte solution to obtain a composite membrane; eliminating bubbles in the composite membrane;

casting the composite membrane using a bar coater and controlling the thickness of the composite membrane;

drying the composite membrane;

annealing the composite membrane;

immersing the composite membrane in HCl and distilled water, wherein the penta-block copolymer electrolyte composite membrane consisting of poly((t-butyl-styrene)-b-(ethylene-r-propylene)-b-(styrene-r-styrene sulfonate)-b-(ethylene-r-propylene)-b-(t-butyl-styrene)) is formed.

* * * * *